(12) United States Patent  (10) Patent No.: US 7,553,086 B2
Kang et al.  (45) Date of Patent: Jun. 30, 2009

(54) HYDRODYNAMIC JOURNAL BEARING

(75) Inventors: Sun Goo Kang, Los Angeles, CA (US);
Marshall Saville, Torrance, CA (US);
Keith A. Hurley, Garden Grove, CA (US)

(73) Assignee: Honeywell International Inc., Morristown, NJ (US)

( * ) Notice: Subject to any disclaimer, the term of this patent is extended or adjusted under 35 U.S.C. 154(b) by 874 days.

(21) Appl. No.: 10/896,099

(22) Filed: Jul. 20, 2004

(65) Prior Publication Data

US 2006/0018574 A1 Jan. 26, 2006

(51) Int. Cl.
*F16C 27/02* (2006.01)
*F16C 17/02* (2006.01)

(52) U.S. Cl. .................. 384/103; 384/104; 384/106
(58) Field of Classification Search ............... 384/103, 384/104, 106
See application file for complete search history.

(56) References Cited

U.S. PATENT DOCUMENTS

| | | | |
|---|---|---|---|
| 3,809,443 | A | 5/1974 | Cherubim |
| 4,133,585 | A | 1/1979 | Licht et al. |
| 4,262,975 | A | 4/1981 | Heshmat |
| 4,277,113 | A | 7/1981 | Heshmat |
| 4,300,806 | A | 11/1981 | Heshmat |
| 5,116,143 | A | 5/1992 | Saville et al. |
| 5,228,785 | A | 7/1993 | Saville et al. |
| 5,498,083 | A | 3/1996 | Brown |
| 5,531,522 | A | 7/1996 | Ide et al. |
| 5,584,582 | A | 12/1996 | Brown |
| 5,634,723 | A | 6/1997 | Agrawal |
| 5,658,079 | A * | 8/1997 | Struziak et al. ............. 384/106 |
| 5,743,654 | A | 4/1998 | Ide et al. |
| 5,885,004 | A | 3/1999 | Scharrer et al. |
| 5,988,885 | A | 11/1999 | Heshmat |

(Continued)

FOREIGN PATENT DOCUMENTS

EP 0490443 A 6/1992

(Continued)

OTHER PUBLICATIONS

International Search Report dated Dec. 6, 2005.

*Primary Examiner*—William C Joyce
(74) *Attorney, Agent, or Firm*—Oral Caglar, Esq.

(57) ABSTRACT

A journal foil bearing comprising a retaining member having an inner surface which defines a shaft opening within which a rotatable shaft is receivable for rotation; and a foil assembly affixed to and lining the inner surface and comprising a plurality of foil sub-assemblies each subtending a circumferential segment, of the inner surface. Each of the foil sub-assemblies may comprise an under foil sandwiched between a spring foil disposed radially outwardly of the under foil, and a top foil disposed radially inwardly of the under foil, the under foil, the top foil, and the spring foil each having a leading edge distal from a trailing edge in a direction of rotation of the rotatable shaft, and each of the under foil, the top foil, and the spring foil being affixed to the retaining member along their respective leading edge, their respective trailing edge, or both their respective leading edge and their respective trailing edge, wherein a radius of curvature of the top foil is less than a radius of curvature of the under foil. A method of supporting a rotating shaft is also disclosed.

3 Claims, 8 Drawing Sheets

U.S. PATENT DOCUMENTS 6,158,893 A    12/2000   Heshmat
2003/0012466 A1*   1/2003   Shimizu et al. ............. 384/103

FOREIGN PATENT DOCUMENTS

| | | | |
|---|---|---|---|
| EP | 1270971 | A | 1/2003 |
| JP | 60136615 | A | 7/1985 |
| JP | 60101316 | A | 10/1985 |
| SU | 1555556 | A1 | 4/1990 |
| WO | WO 2005/073572 | | 8/2005 |

\* cited by examiner

HYDRODYNAMIC JOURNAL BEARING

BACKGROUND OF THE INVENTION

The present invention generally relates to apparatus and methods related to a journal foil bearing. More specifically, to a journal foil bearing comprising multiple foils, wherein each may have a different radius of curvature.

Fluid film hydrodynamic bearings may operate on the principle that a high speed rotating member, such as a shaft, is at least slightly eccentric with respect to rotation about its longitudinal axis. Therefore, if the shaft is enclosed by a close-fitting, compliant, annular element such as a thin foil encased within a stationary retaining member, the eccentricity of rotation within such retaining member will form and maintain a pressurized fluid (e.g., air) film between the shaft and the compliant foil. The high speed rotation of the shaft generates a high pressure in the fluid film, which fluid film supports the load imposed by the shaft. The lowest rotational speed at which this occurs is known as the lift-off speed. A spring foil, i.e., a resilient backing member, may be disposed between the compliant foil and the stationary member (sometimes referred to as a cartridge, retainer or base) to accommodate deflections of the foil resulting from pressurization, centrifugal forces and temperature differentials in order to maintain optimum or at least adequate film layer geometry. The fluid film hydrodynamic bearing desirably has high load capacity and high damping for suppression of shaft whirl.

Rotor speeds for machines that use foil bearings may sometimes be limited by the amount of damping that the foil bearings provide. High damping is required to suppress the shaft whirl increasing to a point where it can become unstable. Increasing the pre-load on the shaft, which increases the amount of resistance to turning imposed on the shaft by the foil bearings prior to the shaft reaching the lift-off speed, can increase the coulomb damping, as the friction of coefficient of the foils (of the foil bearing) sliding against each other is proportional to the preload on the shaft. However, higher pre-load is not desired, since it may also increase the starting torque, accelerate the wear of a coating on the foil, and may increase the lift-off speed.

It may be desirable to provide an increased amount of damping while decreasing the pre-load, as by increasing damping, the stability of the rotor at high speeds will be improved. By decreasing pre-load, a lower starting torque will be required, which may improve the durability of the bearing foil.

Examples in the art directed towards an increased amount of damping include U.S. Pat. No. 5,634,723 (Agrawal), which is directed to a design which attempts to increase the coulomb damping of the foil bearing by anchoring different layers of a foil bearing, namely the top foil and the spring foil, in opposite directions to facilitate sliding of the foil layers relative to each other. This approach does not however address increasing fluid film or squeeze film damping, while decreasing bearing pre-load.

U.S. Pat. No. 4,262,975 (Heshmat) is directed to a foil bearing having a variable-pitch spring that becomes stiffer in the direction of the shaft rotation (i.e., from a leading edge of the foil to a trailing edge of the foil). This design attempts to create damping from the relative motion of the layers of foils above the spring, once again focusing on the coulomb damping, but not addressing fluid film damping nor preload on the bearing.

U.S. Pat. No. 4,277,113 (Heshmat) is directed to a foil bearing having a composite material top foil comprising a layer of copper diffused into a steel alloy foil material. This design attempts to increase coulomb damping from the higher friction coefficient of the copper relative to the steel alloy, and from the viscous damping provided by local yielding of the copper layer. This approach also does not address bearing preload, and requires a complex bearing foil having limited durability.

As can be seen, there is a need for a journal foil bearing which provides increased fluid film damping to rotating shafts, while also providing the improvements in performance and durability associated with bearings having relatively lower bearing preload.

SUMMARY OF THE INVENTION

In one aspect of the present invention, a journal foil bearing comprises a retaining member having an inner surface which defines a shaft opening within which a rotatable shaft is receivable for rotation; and a foil assembly lining the inner surface, the foil assembly comprising an under foil sandwiched between a spring foil disposed radially outwardly of the under foil, and a top foil disposed radially inwardly of the under foil, wherein a radius of curvature of the top foil is less than a radius of curvature of the under foil.

In another aspect of the present invention, a journal foil bearing comprises a retaining member having an inner surface which defines a shaft opening within which a rotatable shaft is receivable for rotation; and a foil assembly lining the inner surface, the foil assembly comprising an under foil sandwiched between a spring foil disposed radially outwardly of the under foil, and a top foil disposed radially inwardly of the under foil, wherein a radius of curvature of the top foil is greater than a radius of curvature of the under foil.

In still another aspect of the present invention, a journal foil bearing comprises a retaining member having an inner surface which defines a shaft opening within which a rotatable shaft is receivable for rotation; and a foil assembly affixed to and lining the inner surface and comprising a plurality of foil sub-assemblies each subtending a circumferential segment of the inner surface, each of the foil sub-assemblies comprising: an under foil sandwiched between a spring foil disposed radially outwardly of the under foil, and a top foil disposed radially inwardly of the under foil, the under foil, the top foil, and the spring foil each having a leading edge distal from a trailing edge in a direction of rotation of the rotatable shaft, and each of the under foil, the top foil, and the spring foil being affixed to the retaining member along their respective leading edge, their respective trailing edge, or both their respective leading edge and their respective trailing edge, wherein the under foil has a variable radius of curvature from a leading edge of the under foil to the trailing edge of the under foil.

In yet another aspect of the present invention, a gas turbine comprises a turbine wheel in physical communication with a rotatable shaft, and a journal foil bearing comprising: a retaining member having an inner surface which defines a shaft opening within which said rotatable shaft is receivable for rotation; and a foil assembly affixed to and lining the inner surface and comprising a plurality of foil sub-assemblies each subtending a circumferential segment of the inner surface, each of the foil sub-assemblies comprising: an under foil having an under foil leading edge distal from an under foil trailing edge along a rotational direction of the rotatable shaft, a spring foil having a spring foil leading edge distal from a spring foil trailing edge along a rotational direction of the rotatable shaft, a top foil having a top foil leading edge distal from a top foil trailing edge along a rotational direction of the rotatable shaft, the under foil being sandwiched between the spring foil disposed radially outwardly of the under foil, and the top foil disposed radially inwardly of the under foil, the under foil, the top foil, and the spring foil each being affixed to the retaining member along their trailing edge, wherein a radius of curvature of the top foil is less than a radius of curvature of the under foil, wherein the top foil has a variable radius of curvature from a leading edge of the top foil to the trailing edge of the top foil, and wherein the under foil has a variable radius of curvature from a leading edge of the under foil to the trailing edge of the under foil.

In a further aspect of the present invention, a gas turbine comprises: a turbine wheel in physical communication with a rotatable shaft; and a journal foil bearing for supporting the rotatable shaft, the journal foil bearing comprising: a retaining member having an inner surface which defines a shaft opening within which the rotatable shaft is receivable for rotation; and a foil assembly affixed to and lining the inner surface and comprising a plurality of foil sub-assemblies each subtending a circumferential segment of the inner surface, each of the foil sub-assemblies comprising: an under foil sandwiched between a spring foil disposed radially outwardly of the under foil, and a top foil disposed radially inwardly of the under foil, the under foil, the top foil, and the spring foil each having a leading edge distal from a trailing edge in a direction of rotation of the rotatable shaft, and each of the under foil, the top foil, and the spring foil being affixed to the retaining member along their respective leading edge, their respective trailing edge, or both their respective leading edge and their respective trailing edge, wherein a radius of curvature of the top foil is greater than a radius of curvature of the under foil.

In still a further aspect of the present invention, a method of supporting a rotating shaft comprises the steps of: a) disposing a rotatable shaft within a journal foil bearing assembly; and b) rotating the rotatable shaft at an angular speed sufficient to cause lift-off of the rotatable shaft from a top foil of the journal foil bearing assembly, the journal foil bearing assembly comprising: a retaining member having an inner surface which defines a shaft opening within which said rotatable shaft is disposed for rotation; and a foil assembly affixed to and lining the inner surface and comprising a plurality of foil sub-assemblies each subtending a circumferential segment of the inner surface, each of the foil sub-assemblies comprising: an under foil sandwiched between a spring foil disposed radially outwardly of the under foil, and a top foil disposed radially inwardly of the under foil, the under foil, the top foil, and the spring foil each having a leading edge distal from a trailing edge in a direction of rotation, and each of the under foil, the top foil, and the spring foil being affixed to the retaining member along their respective leading edge, their respective trailing edge, or both their respective leading edge and their respective trailing edge, wherein a radius of curvature of the top foil is different from a radius of curvature of the under foil.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides a journal foil bearing which may be suitable for supporting a shaft rotating at a speed sufficient to obtain lift-off of the rotating shaft from the top foil of the journal foil bearing. Such shafts rotating at speeds which may obtain lift-off may be found connected to turbines in, for example, a gas turbine engine, a turbocharger, and in other motor driven high-speed rotating machinery. The present invention relates to pneumatic journal bearings supporting a rotating shaft of a variety of high speed rotating systems, such as auxiliary power units for aircraft or air conditioning machines. Also, foil bearing systems of the present invention may be suitable for high-speed machines such as cryogenic turbo-rotors with both expander and compressor wheels running at tens of thousands of rpm or more.

The present invention may comprise a journal foil bearing having an under foil sandwiched between a spring foil disposed radially outwardly of the under foil, and a top foil disposed radially inwardly of the under foil, wherein a radius of curvature of the under foil may be less than a radius of curvature of the top foil. This is in contrast to the prior art wherein the radius of the under foil and the radius of the top foil are about equal.

Also, the present invention may include a journal foil bearing wherein each of the under foil, the top foil, and the spring foil may be affixed to a retaining member along their respective leading edge, their respective trailing edge, or both their respective leading edge and their respective trailing edge. This also is in contrast to the prior art, wherein the top foil may be affixed to a retaining member at an edge distal from the edge where the under foil is so affixed. This is also in contrast to the prior art, wherein the spring foil may not be affixed to the retaining member. Thus, unlike the prior art, all foil layers for a given point on the circumference of the bearing of the present invention may be affixed at the same location of the retaining member, and all foil layers of the present invention may be affixed at a given location of the retaining member such that they extend in the same direction.

Figure 1:
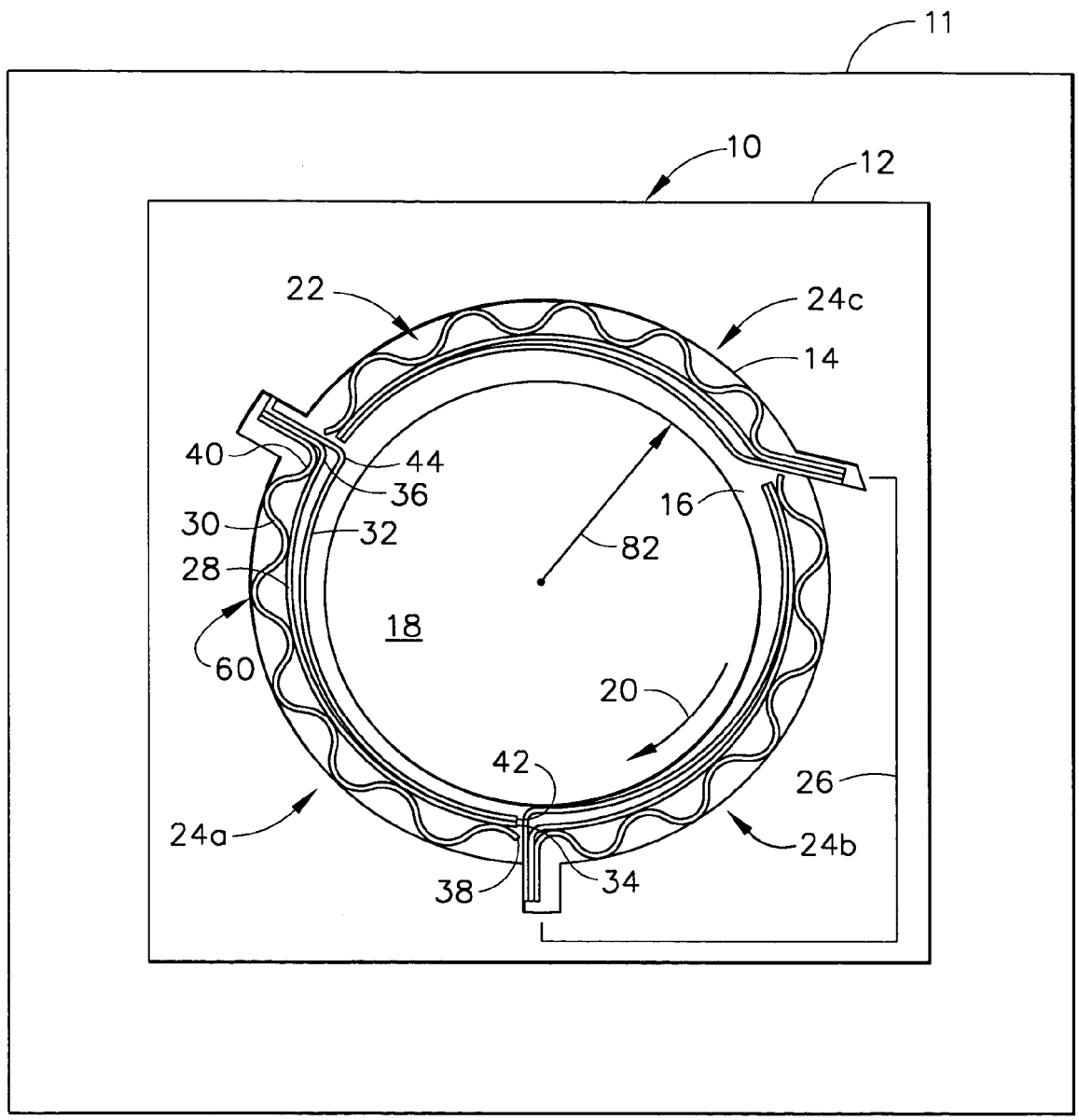
FIG. 1 is a schematic cross-sectional view of a journal foil bearing assembly of an embodiment of the present invention.

In more specifically describing the present invention, FIG. 1 shows a cross-sectional view of a journal foil bearing assembly 10. Journal foil bearing assembly 10 may be disposed within a gas turbine engine 11 comprising a gas turbine wheel (not shown) in physical communication with a rotatable shaft 18. Journal foil bearing assembly 10 may include a retaining member 12 having an inner surface 14 which defines a shaft opening 16 within which rotatable shaft 18 having a radius 82 may be receivable for rotation in a direction of rotation 20. Journal foil bearing assembly 10 may also include a foil assembly 22 which may be affixed to, and disposed to provide a lining of, inner surface 14. Foil assembly 22 may comprise a plurality of foil sub-assemblies 24, each foil sub-assembly 24a-c subtending a circumferential segment 26, which may be less than all of inner surface 14 such that each sub-assembly or each circumferential segment 26 may occupy a portion, e.g., about ⅓ of the circumference of inner surface 14.

Each foil sub-assembly 24 may comprise an under foil 28, which may be sandwiched between a spring foil 30, which may be disposed radially outwardly of under foil 28, and a top foil 32 which may be disposed radially inwardly of under foil 28. Under foil 28 may have an under foil leading edge 34, which may be distal from an under foil trailing edge 36 in direction of rotation 20. Spring foil 30 may have a spring foil leading edge 38, which may be distal from a spring foil trailing edge 40 in direction of rotation 20. Likewise, top foil 32 may have a top foil leading edge 42, which may be distal from a top foil trailing edge 44 in direction of rotation 20. Spring foil 30 may also comprise corrugations 60, which may provide resiliency against being distorted against inner surface 14.

When the direction of rotation 20 is as shown in FIG. 1 (i.e., clockwise), each of under foil 28, top foil 32, and spring foil 30 may be affixed to retaining member 12 along their respective trailing edge (i.e., under foil trialing edge 36, top foil trailing edge 44, and spring foil trailing edge 40).

In another embodiment, wherein the direction of rotation 20 is a direction opposite that shown in FIG. 1 (i.e., counterclockwise, not shown), each of under foil 28, top foil 32, and spring foil 30 may be affixed to retaining member 12 along their, respective leading edge (i.e., under foil leading edge 34, top foil leading edge 42, and spring foil leading edge 38), so long as the foils do not pull out of the slot during start up or a stall condition when the shaft may rub on the foil.

Figure 2:
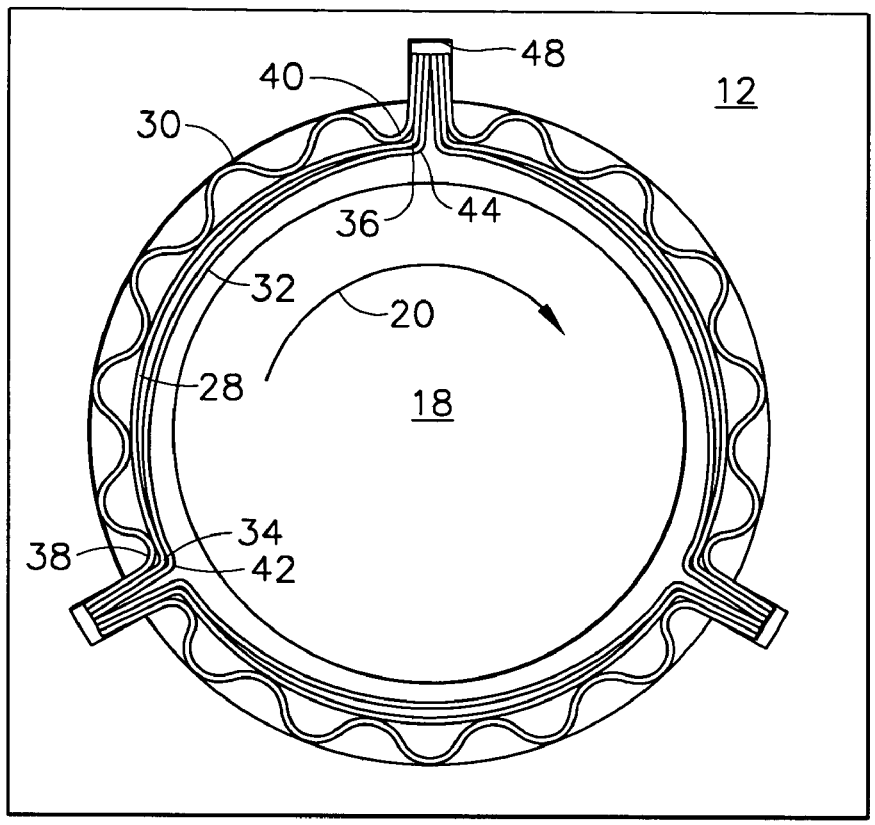
FIG. 2 is a schematic cross-sectional view of a journal foil bearing assembly of another embodiment of the present invention.

As shown in FIG. 2, in still another embodiment, each of under foil 28, top foil 32, and spring foil 30 may be affixed to retaining member 12 along both their respective leading edge (i.e., under foil leading edge 34, top foil leading edge 42, and spring foil leading edge 38), as well as along their respective trailing edge (i.e., under foil trailing edge 36, top foil trailing edge 44, and spring foil trailing edge 40).

Figure 3A:
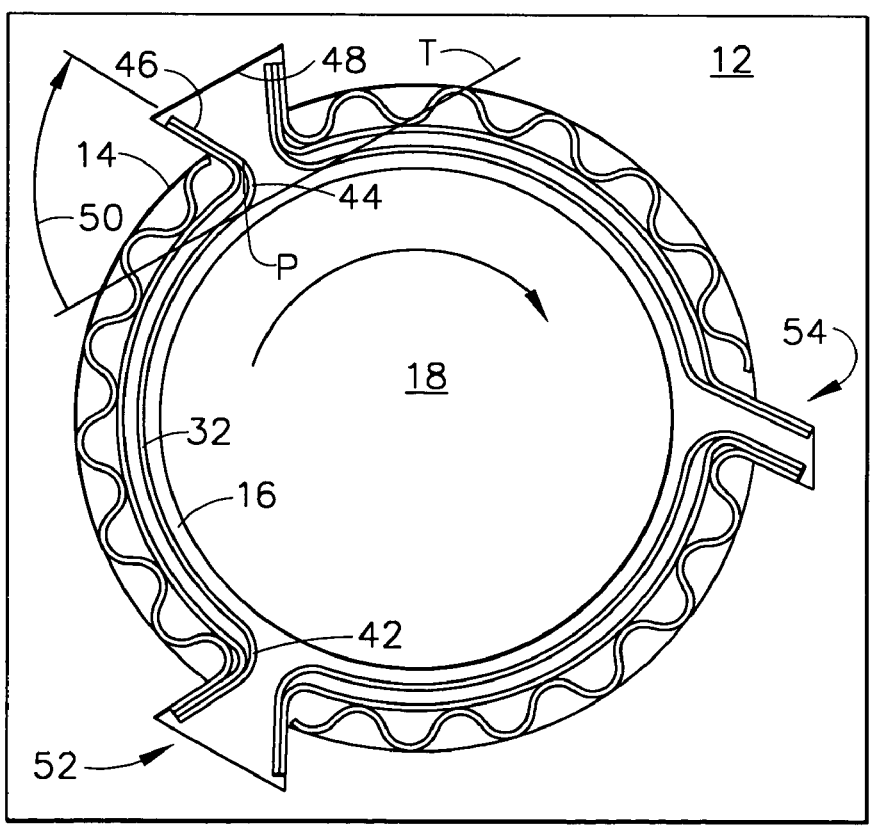
FIG. 3A is a schematic cross-sectional view of a journal foil bearing assembly of another embodiment of the present invention.
Figure 3B:
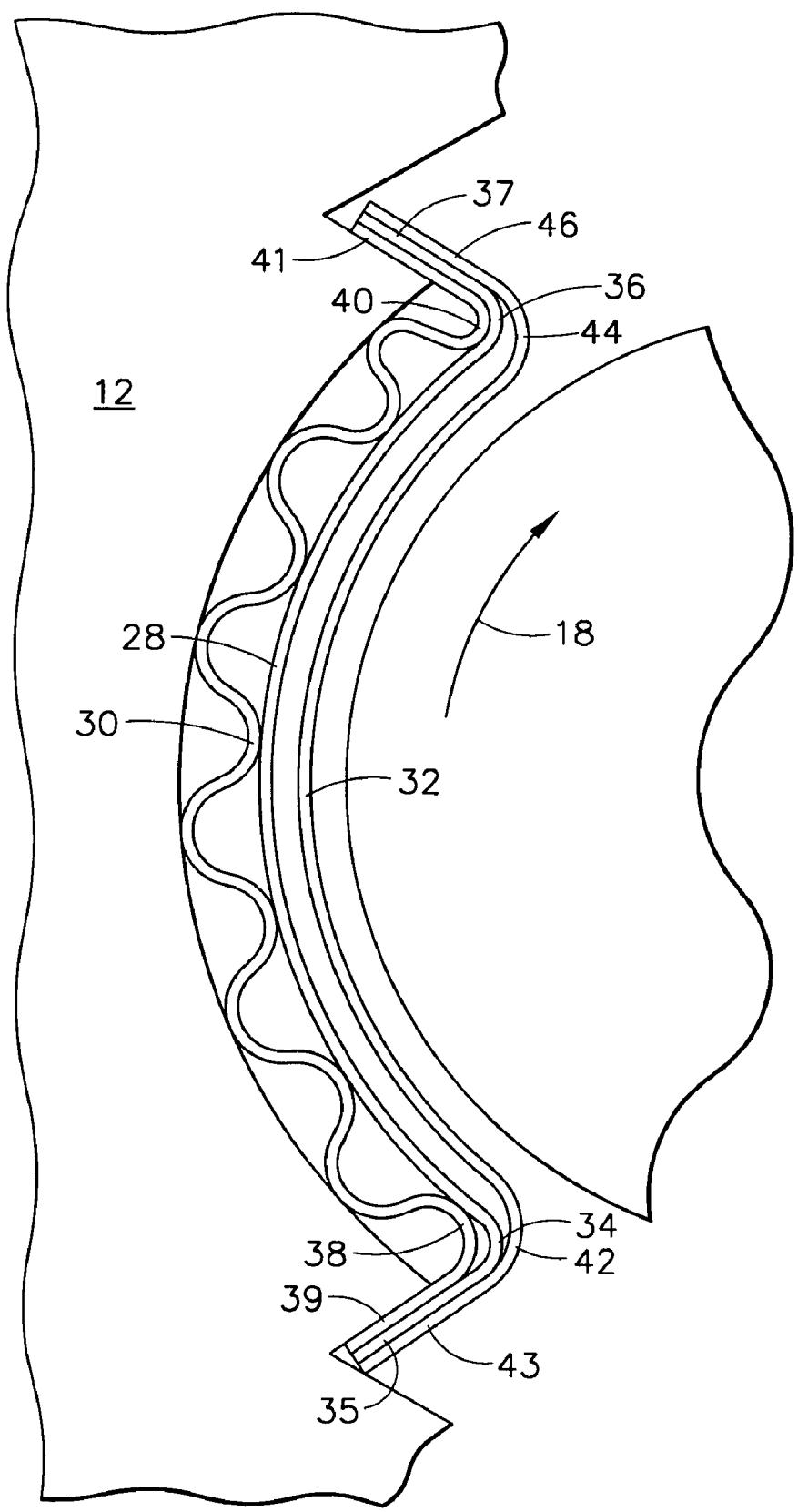
FIG. 3B shows a portion of FIG. 3A.

As shown in FIGS. 3A and 3B, taking top foil 32 as an example, top foil trailing edge 44 may include a top foil trailing edge tab 46 which may be engagable within a slot 48 disposed within retaining member 12. Top foil trailing edge tab 46 may extend away from top foil 32 at a point on top foil 32 where top foil trailing edge 44 begins with respect to inner surface 14. Top foil trailing edge tab 46 and a line T may subtend a top foil trailing edge tab angle 50, wherein line T may be a tangent to inner surface 14 at a point "P" located adjacent to a point on top foil 32 where top foil trailing edge 44 begins.

As shown in FIG. 3B, each of top foil leading edge 42 may have a top foil leading edge tab 43, each top foil trailing edge 44 may have a top foil trailing edge tab 46, each under foil leading edge 34 may have an under foil leading edge tab 35, each under foil trailing edge 36 may have an under foil trailing edge tab 37, each spring foil leading edge 38 may have a spring foil leading edge tab 39, and each spring foil trailing edge 40 may have a spring foil trailing edge tab 41. Each of these corresponding tabs may have a corresponding tab angle as shown in FIGS. 3A and 3B, as determined relative to a line, e.g., line T, at a tangent to inner surface 14 at a point where a particular foil edge begins (in the case of a foil leading edge), or ends (in the case of a foil trailing edge). The respective tab angles, as defined above, may be acute (i.e., less than 90°, FIGS. 3A and 3B), normal or almost normal (i.e., about 90°, FIG. 2), or obtuse (i.e., greater than 90°, FIGS. 3A and 3B) relative to the tangent line T as defined above. Furthermore, the tab angles of each foil may be similar, (e.g., all tab angles may be acute angles, as shown in all-acute-tab-angle slot 52), or may be a combination of different tab angles (e.g., as shown in combination-of-different-tab-angles slot 54. Slot 48 may also parallel a particular tab angle as is shown in all acute tab angle slot 52, and/or may provide a slot which may be complementary to one or more tab angles, as is shown in combination of different tab angles slot 54.

Figure 4A:
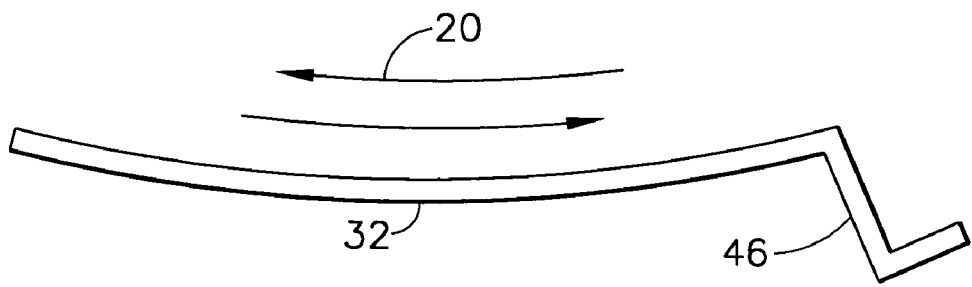
FIGS. 4A-4G are side views of top foils, according to embodiments of the present invention.
Figure 4B:
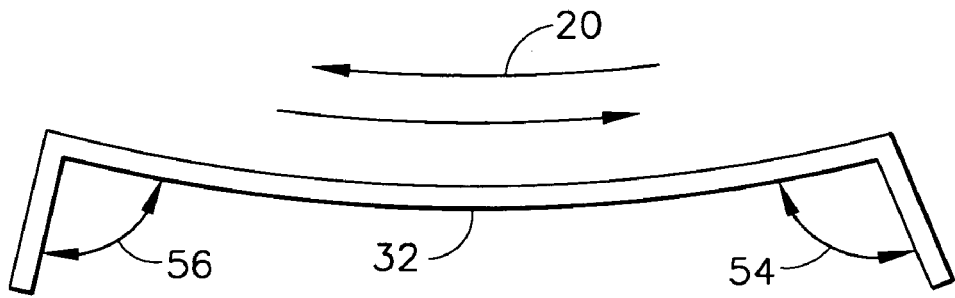
Figure 4C:
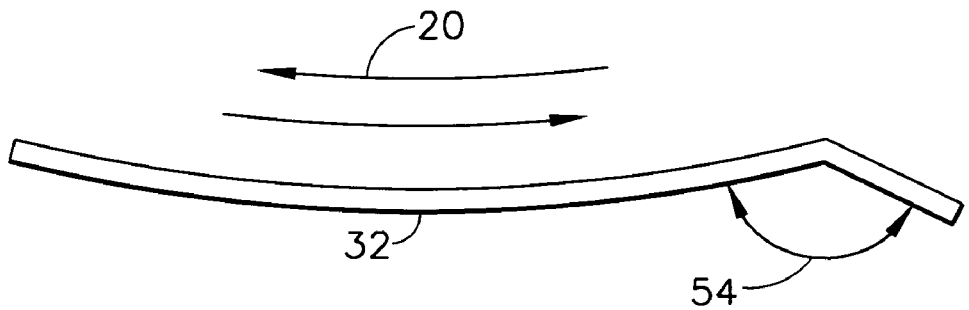
Figure 4D:
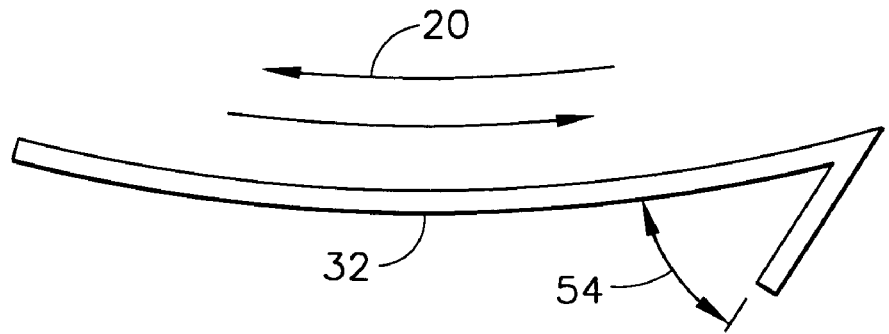
Figure 4E:
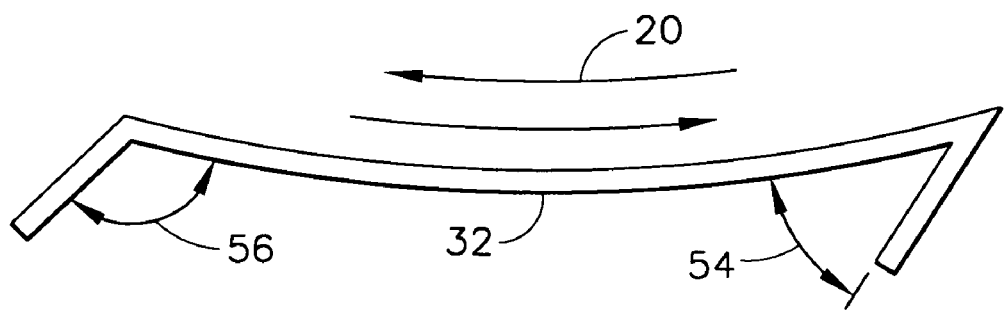
Figure 4F:
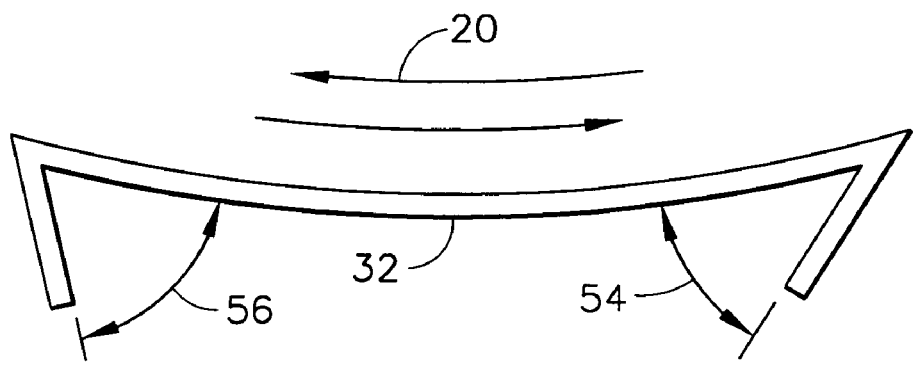
Figure 4G:
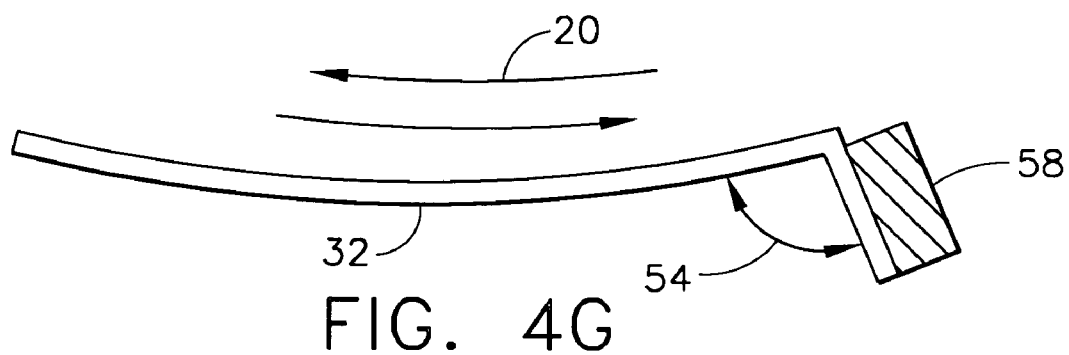
Figure 5:
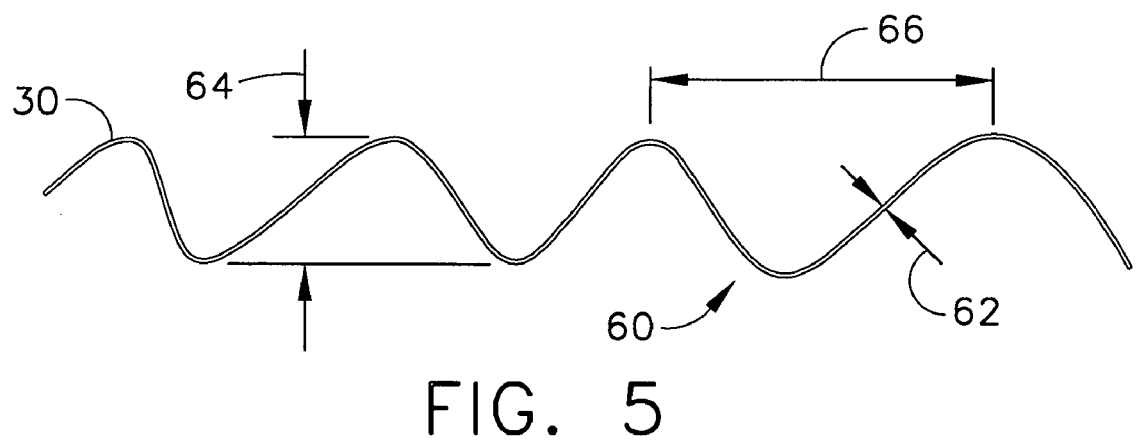
FIG. 5 is a side view of a portion of a spring foil, according to the present invention.

FIGS. 4A-4G show various embodiments of foil tab geometries (e.g., of top foil 32), wherein the foil tab geometry of the top foil leading edge 42 and the top foil trailing edge 44 may be dependent on which direction of rotation 20 (i.e., clockwise direction or counterclockwise direction) may be used. In particular, FIG. 4A shows that top foil trailing edge tab 46 (assuming a counterclockwise direction of rotation 20) may comprise a combination of portions, each of which may have a separate tab angle or shape. As shown in FIG. 4B, assuming a counterclockwise direction of rotation 20, top foil leading edge tab angle 56 may not be equal to top foil trailing edge tab angle 54 (See e.g., all acute tab angle slot 52 in FIG. 3A). FIG. 4C shows an obtuse tab angle, FIG. 4D shows an acute tab angle, FIG. 4E shows both an obtuse tab angle and an acute tab angle, and FIG. 4F shows an embodiment wherein top foil leading edge tab angle 56 may be equal to top foil trailing edge tab angle 54. FIG. 4G shows a tab block 58, which may be affixed to the top foil leading edge 42 and/or the top foil trailing edge 44. The embodiment shown in FIG. 4E may provide the further benefit of fitting within inner surface 14 in only one conformation, which may assist in assembly of the unit in which the present invention is located. The configuration in FIG. 4E may also prevent the foils from shifting axially during operation. Furthermore, having tabs on both the leading edge and the trailing edge of the foil may assist in locating the foils during assembly.

Top foil 32 and under foil 28 may comprise compliant foils which may tend to flatten along spring foil 30 adjacent to inner surface 14 under the influence of shaft radial motion of rotatable shaft 18 (See FIG. 1). FIGS. 1-7 are all schematic in that the radial thickness of both the foils from which the foil assembly may be made, and the radial spacing between foils, as well as the depth of the corrugations in the spring foils, may be somewhat exaggerated in the drawings for purposes of clarity of illustration. Actual dimensions, (shown schematically on a portion of spring foil 30 in FIG. 5) for the foils may depend on the diameter of rotatable shaft 18. However, taking a two-inch (5.1 centimeter) diameter rotatable shaft as an example, a foil thickness 62 for spring foil 30, under foil 28 and/or top foil 32 may be about 2 to about 6 mils each. Spring foil 30 may also include corrugations 60, which may have a corrugation depth 64 of about 5 to 20 mils, and a circumferential crest-to-crest (or trough-to-trough) distance 66 of about 5 to 20 mils. As is well known in the art, suitable coatings may be applied to one or more surfaces of the foils.

Figure 6:
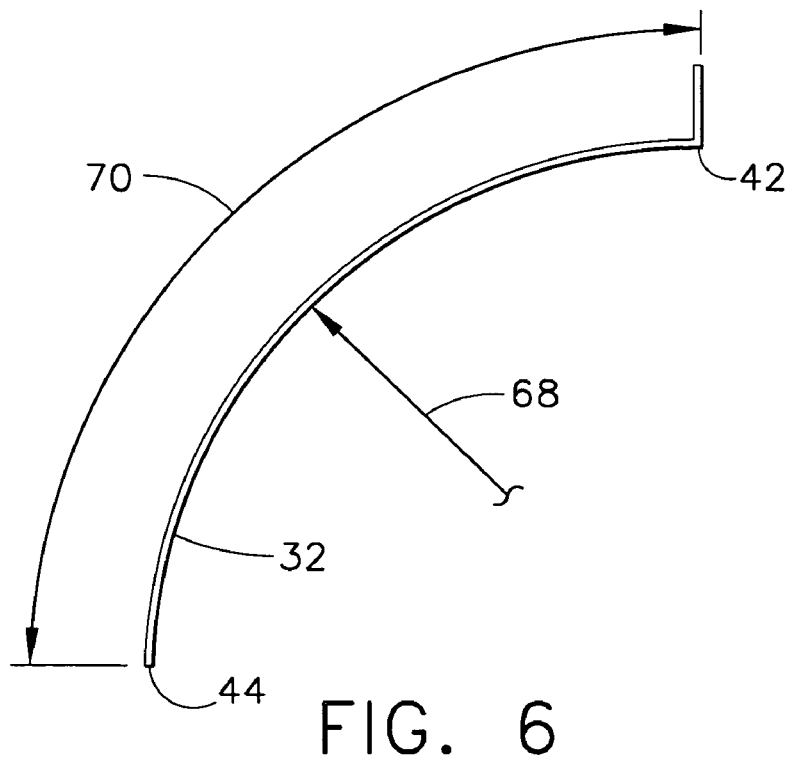
FIG. 6 is a side view of a top foil having a constant radius of curvature foil, according to the present invention.

As shown in FIG. 6, each of the foils (e.g., top foil 32) may have a first radius of curvature 68, which may be constant over the entire length of top foil 32, which may thus remain constant over the entire arc length 70 of a foil extending from the leading edge to the trailing edge (e.g., top foil leading edge 42 to top foil trailing edge 44). In an embodiment, the radius of curvature of top foil 32 may be different from a radius of curvature of under foil 28 (FIG. 1). In an embodiment, the radius of curvature of top foil 32 may be less than the radius of curvature of under foil 28. In another embodiment, the radius of curvature of top foil 32 may be greater than the radius of curvature of under foil 28. Also, the radius of curvature of under foil 28 may be less than the radius 82 of rotatable shaft 18, or the radius of curvature of under foil 28 may be greater than the radius 82 of rotatable shaft 18. Portions of radius of curvature of top foil 32 may be less than the radius 82 of rotatable shaft 18, or the radius of curvature of top foil 32 may be greater than the radius 82 of rotatable shaft 18.

Figure 7:
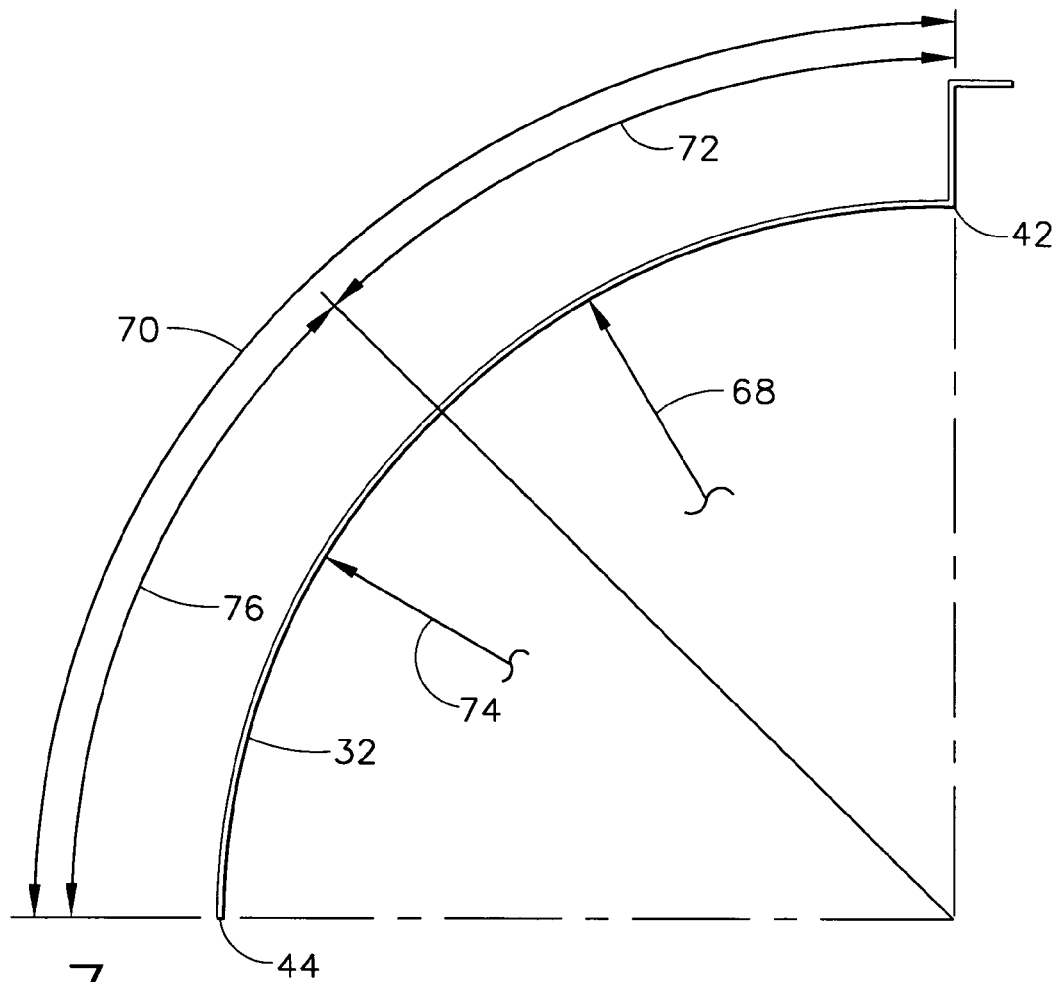
FIG. 7 is a side view of a top foil having a plurality of sections, each section having a discrete radius of curvature, also according to the present invention.

In another embodiment, as shown in FIG. 7, each foil (e.g., top foil 32) may have a plurality of different radii of curvatures (e.g., a first radius of curvature 68 over a first arc length 72, and a second radius of curvature 74 over a second arc length 76). The radius of curvature may increase from a leading edge to a trailing edge, or, the radius of curvature of a foil may decrease from a leading edge to a trailing edge of the foil.

Figure 8A:
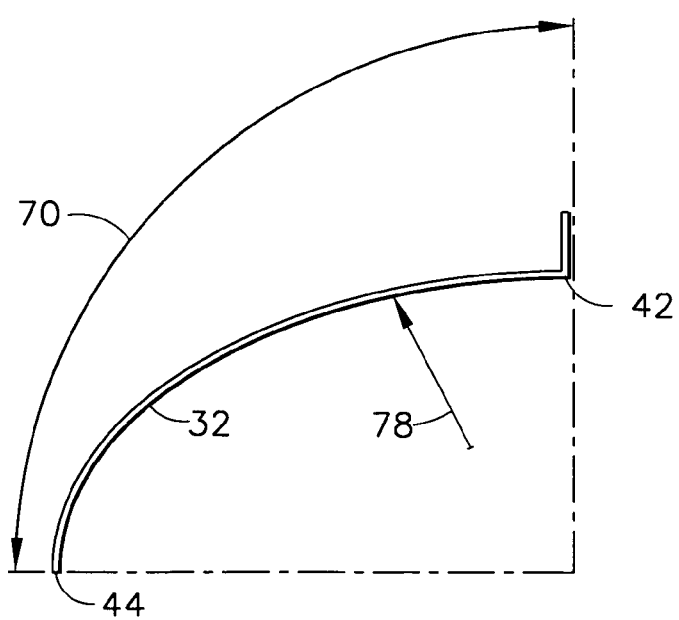
FIGS. 8A and 8B are side views of a top foil having a continuously variable radius of curvature, according to the present invention.
Figure 8B:
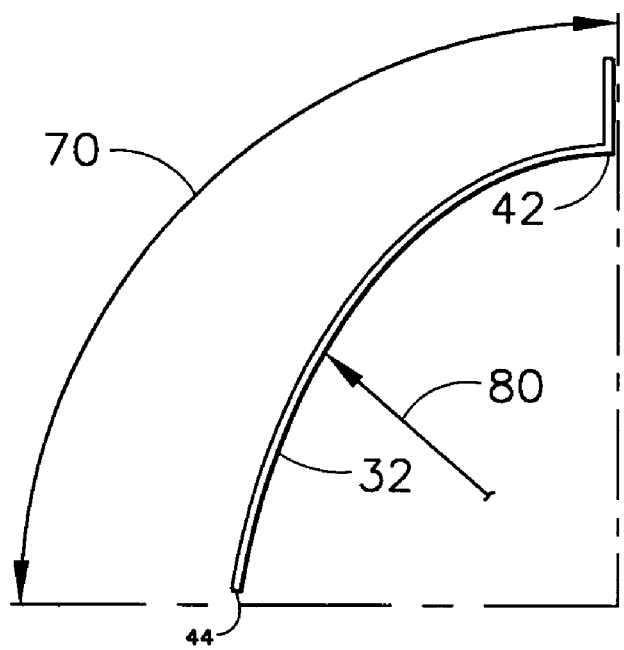

As shown in FIG. 8A, the top foil 32, the under foil 28, and/or the spring foil 30 may have a variable radius of curvature 78, which may continuously increase as a function of arc length 70 from a leading edge to a trailing edge of the foil (e.g., from top foil leading edge 42 to top foil trailing edge 44 of top foil 32). In addition, as shown in FIG. 8B, the foil may have a variable radius of curvature 80, which may continuously decrease as a function of arc length 70 from a leading edge to a trailing edge of the foil (e.g., from top foil leading edge 42 to top foil trailing edge 44 of top foil 32). Further, the increase and/or decrease of the radius of curvature of the foil may be linear or non-linear with respect to the arc length.

Figure 9:
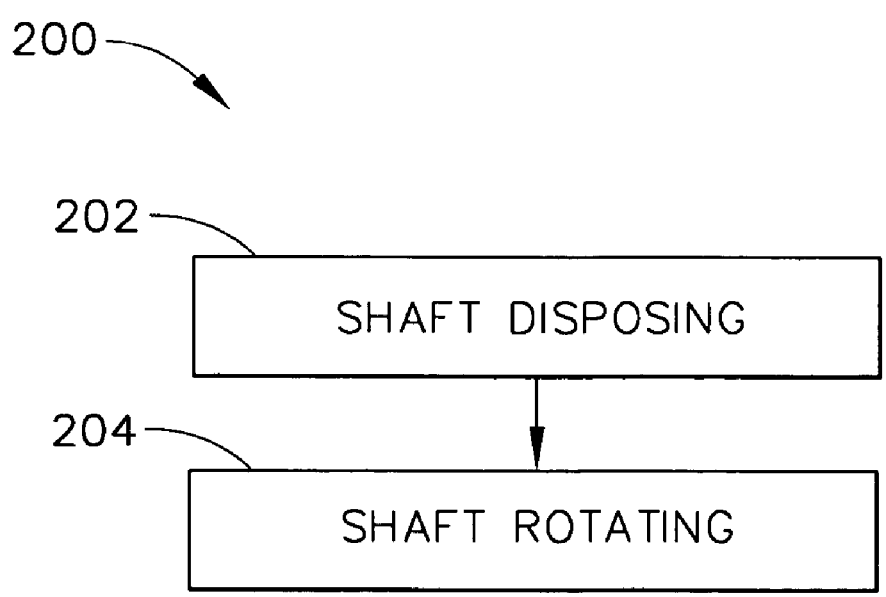
FIG. 9 is a flow chart representing steps of a method of the present invention.

In operation, the ready availability of clean process fluid or ambient air as a bearing fluid makes hydrodynamic, fluid film lubricated bearings suitable for use in high speed rotating machinery. For example, the present invention may be suitable for use along turbine shaft of a gas turbine (not shown). The ability of the fluid film generated by the relative motion of the two converging surfaces (i.e., top foil 32 and rotatable shaft 18) to support the loads placed thereon depends on the pressure of the fluid film. The pressure of the fluid film may be related to the thickness of the fluid film, which may be expressed as a height (not shown) measured between rotatable shaft 18 and top foil 32. The thicker the fluid film, the lower the pressure and consequently, the less load that can be supported by the film. The converse may also be true. Also, the thinner the fluid film, the better the damping ability of the fluid film as both load capacity and damping may be increased as film becomes thinner, but higher load capacity may not generate higher damping. Accordingly, an embodiment of the present invention includes a method of supporting a rotating shaft 200, the steps of which are shown in flow chart form in FIG. 9. Method 200 may comprise a shaft disposing step 202, wherein rotatable shaft 18 may be disposed within any of the above described embodiments, or combination of embodiments, of a journal foil bearing assembly 10. Step 202 may then be followed by a shaft rotating step 204, wherein rotatable shaft 18 may be rotated at an angular speed sufficient to cause lift-off (not shown) of rotatable shaft 18 from top foil 32 of journal foil bearing assembly 10.

It should be understood, of course, that the foregoing relates to exemplary embodiments of the invention and that modifications may be made without departing from the spirit and scope of the invention as set forth in the following claims.

We claim:

1. A journal foil bearing comprising:
   a retaining member having an inner surface which defines a shaft opening within which a rotatable shaft is receivable for rotation; and
   a foil assembly affixed to and lining the inner surface, the foil assembly comprising a plurality of foil sub-assemblies each of the plurality of foil sub-assemblies having multiple foil segments subtending a circumferential segment of the inner surface, each of the foil sub-assemblies comprising:
   an under foil sandwiched between a spring foil disposed radially outwardly of the under foil, and a top foil disposed radially inwardly of the under foil,
   each foil segment of the under foil, the top foil, and the spring foil each having a leading edge distal from a trailing edge in a direction of rotation of the rotatable shaft, and each foil segment of the under foil, the top foil, and the spring foil being affixed to the retaining member along their respective leading edge, their respective trailing edge, or both their respective leading edge and their respective trailing edge,
   wherein the top foil has a variable radius of curvature from a leading edge of each foil segment of the top foil to the trailing edge of each foil segment of the top foil, the radius of curvature of the top foil decreases from the leading edge of the top foil to the trailing edge of the top foil.

2. The journal foil bearing of claim 1, wherein the radius of curvature of the top foil decreases continuously from the leading edge of the top foil to the trailing edge of the top foil.

3. The journal foil bearing of claim 1, wherein the under foil, the top foil, and the spring foil are each affixed to the retaining member along their respective trailing edge.

* * * * *